United States Patent Office 3,459,788
Patented Aug. 5, 1969

3,459,788
PROCESS FOR PREPARATION OF BIS-(β-HYDROXYETHYL)-BENZENE DICARBOXYLATE
Kichiji Enoki, Susumu Adachi, Shigeo Sakata, Mitsuo Kumaki, and Eiichi Ikari, Takaoka-shi, Hiroshi Takakura, Imizu-gun, Nobuyasu Takahashi and Komei Takashima, Takaoka-shi, and Munemasa Yamamoto, Tonami-shi, Japan, assignors to Nippon Soda Kabushiki Kaisha, Tokyo-to, Japan, a company of Japan
No Drawing. Filed Feb. 23, 1965, Ser. No. 434,671
Claims priority, application Japan, Feb. 25, 1964, 39/9,356; Mar. 30, 1964, 39/17,354; Aug. 7, 1964, 39/44,312; Nov. 11, 1964, 39/63,420
Int. Cl. C07c 67/00, 69/82
U.S. Cl. 260—472                                7 Claims

ABSTRACT OF THE DISCLOSURE

Ethylene oxide and terephthalic acid are reacted in a molar ratio of the former to the latter of at least 1.3 and in the presence of at least one catalyst and an amount of solvent no greater, by weight, than the weight of the terephthalic acid to produce bis-(β-hydroxyethyl) terephthalate. The products are useful as intermediates for fiber-forming polymers.

---

This invention relates to a novel and improved process for preparation of bis-(β-hydroxyethyl)-benzene dicarboxylate, having the formula

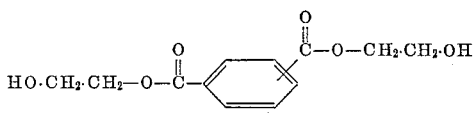

More particularly, this invention relates to a novel process for production of bis-(β-hydroxyethyl)-benzene dicarboxylate comprising an addition reaction of ethylene oxide to benzene dicarboxylic acid in a substantially solvent free medium.

It has now been found that if the addition reaction is carried out without the use of inert solvent or with the use of only a very limited quantity of inert solvent, the rate of reaction is high and, therefore, the reaction time is very short and undesirable by-products are scarcely produced.

Compared with a known process to produce bis-(β-hydroxyethyl)-terephthalate which consists of an addition reaction of ethylene oxide to terephthalic acid in a large amount of water or inert organic solvent in the presence of alkali metal hydroxide or tertiary amines as catalyst, the process of the invention has many characteristic advantages. In this process, no solvent recovery and no purification of the compound obtained is necessary. Furthermore, the reaction time is short and the amount of the reaction mixture is small, so that a much smaller reactor may be used.

Generally speaking, the process of the invention is conducted as follows:

Into a pressure reactor in which air is replaced by inert gas such as nitrogen, 1 mole of a benzene dicarboxylic acid, at least 1.3 moles, more preferably 1.5–4.0 moles, of ethylene oxide and at least 0.01 percent of a catalyst are charged, calculated on the weight of the benzene dicarboxylic acid. The mixture is heated under agitation to the reaction temperature of 80–160° C., more preferably 100–130° C., during a period ranging from 1 minute to a few hours. After the reaction is completed, excess of unreacted ethylene oxide may be recovered. Usually, the reaction mixture is dissolved in hot water, and the hot solution is filtered to recover the residue of unreacted benzene dicarboxylic acid. The filtrate is cooled, and bis-(β-hydroxyethyl)-benzene dicarboxylate is obtained in the form of needles. The mother solution separated from the product is heated to the boiling point with addition of sodium hydroxide. After the ensuing hydrolysis, the solution is acidified under cooling, and a second batch of benzene dicarboxylic acid is recovered as precipitate.

The benzene dicarboxylic acid should be purified to such a degree that yellow or brown coloring of polyesters formed by condensation of the product bis-(β-hydroxyethyl)-benzene dicarboxylate does not occur.

Benzene dicarboxylic acids usually have a varying bulk density ranging from 0.3 to 0.9. When terephthalic acid or isophthalic acid is used, having at least a bulk density of 0.6, the reaction rate at the initial stage of the reaction is increased. However when the bulk density is 0.5 at the utmost, considerable longer time is required to start the reaction, and by-products may be produced which impair the quality of the polyesters obtained. Compressing or pelletizing is an effective method to elevate the bulk density; however, high density of the benzene dicarboxylic acid may be obtained by recrystallization or by precipitating by acidification of the alkali salt solution under a condition to produce dense crystals.

The ethylene oxide used in the reaction should be purified to remove such impurities as, e.g. aldehydes, which cause coloring of polyesters.

Theoretically, 2 moles of ethylene oxide to one mole of benzene dicarboxylic acid are required. But, when at least a 1.3 mole ratio is applied, the rates of the reaction are so high as to inhibit a formation of harmful by-products, 5 moles or more of charge of ethylene oxide is generally not necessary, and excess of ethylene oxide is occasionally harmful.

The catalyst of the addition reaction is selected properly from the groups as follows:

(A) Quaternary ammonium salts: tetramethylammonium chloride and bromide, tetraethylammonium chloride and bromide, trimethylphenylammonium chloride and bromide etc.

(B) Tertiary amines: trimethylamine, triethylamine, dimethylethanolamine, diethylethanolamine, N-methylmorpholine, pyridine, picoline, etc.

(C) Secondary amines: diethylamine, dimethylamine, diethanolamine, N-methylethanolamine, N-methyl-β-cyanoethylamine, piperidine, morphorine, etc.

(D) Primary amines: mono - methylamine, ethanolamine, aniline, etc.

(E) Salts of amines: terephthalates, isophthalates, chlorides and bromides of amines stated in (B), (C) and (D).

(F) Phosphines: triethylphosphine, tripropylphosphine, diethylphenylphosphine, etc.

(G) Amides and amino acids: dimethylformamide, tetra-methylurea, valerolactam, ω-aminoenanthic acid, etc.

Among the aforesaid catalysts, tertiary and secondary aliphatic amines and nitrogen-containing alicyclic compounds and their terephthalate and isophthalate salts are particularly effective; also, the catalysts of groups (C) to (G) are novel for the addition reaction of ethylene oxide with compounds having carboxyl radicals.

The proper amount of catalyst ranges from 0.01–2 percent, preferably 0.05–1 percent of the amount of benzene dicarboxylic acid used.

The co-catalyst such as isophthalic acid and lower alkyl isophthalate may be applied in about the same amount as the catalyst.

The range of the reaction temperature is from 80° C. to 160° C., practically from 100° C. to 130° C.

The time of the reaction is dependent on the amount of ethylene oxide used, the amount of formation of undesirable by-products such as represented by the general formula

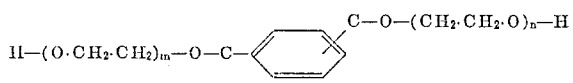
H—(O·CH₂·CH₂)ₘ—O—C—⟨⟩—C—O—(CH₂·CH₂·O)ₙ—H wherein $m$ and $n$ each represents an integer of 1–3 and $m+n \geq 3$, and the rate of removal of heat of reaction out of the reaction system. If the reaction is completed or stopped within 30 minutes, especially, for about 10 minutes, the formation of the aforesaid by-product scarcely occurs. But, owing to the form of the reactor or others, a longer reaction time may be required in some cases.

In the process of the invention, in order to accelerate the addition reaction, following (a), (b), (c) or a combination of (a) and (b) or (a) and (c) is applied as a usual or additional procedure.

(a) At least 2 moles of ethylene oxide is added as the initial charge.

(b) At the most an equal amount to the amount of benzene dicarboxylic acid of the compound substantially obtained in the reaction is added or recycled.

(c) Furthermore, an inert solvent in a small amount, at the utmost equal to the amount of benzene dicarboxylic acid may be added; such solvents are: acetone, methylethylketone, cyclohexanone, benzene, toluene, xylene, hexane, heptane, etc.

For example, in application of (a), if 3 mole of ethylene oxide is applied as initial charge, the reaction may be completed in only about 20 minutes.

Usually, the reaction pressure is maintained at a range of 5–15 kg./cm.² gauge.

After the reaction, unreacted ethylene oxide and volatile inert solvent, if it is employed, are recovered simultaneously by releasing pressure.

Usually, both batch and continuous reaction systems may be employed for carrying out the reaction.

In accordance with the process of this invention, excellent bis-($\beta$-hydroxyethyl)-benzene dicarboxylate is obtained by a simple procedure using simple apparatus for a very short time. This process is therefore useful for industrial application.

The following examples may illustrate more precisely the process of this invention, but they are given by way of illustration and not of limitation.

Example 1

A mixture of 20 g. of purified terephthalic acid having a bulk density of 0.93 g./ml., 10.8 g. of purified ethylene oxide and 0.2 g. of triethylamine were heated at 120° C. for 50 minutes in a Pyrex autoclave previously filled with oxygen-free nitrogen under agitation. After the reaction was completed, the mixture was dissolved in 100 ml. of pure water at 65° C., and the solution was filtered. The residue consisted of 0.6 g. of unreacted terephthalic acid which was recovered. The filtrate was cooled to 0–5° C., crystals were precipitated. 28.2 g. of colorless needles having a melting point of 109.5–111° C. were obtained. The product did not show a depression of the melting point with an authenic sample of bis-($\beta$-hydroxyethyl)-terephthalate by admixture. To the mother solution separated from the needles, 0.4 g. of NaOH was added, and the solution was heated to the boiling point for 10 minutes. After cooling, the solution was acidified by 35% HCl aq. and 0.6 g. of terephthalic acid was recovered as precipitate. The yield of bis-($\beta$-hydroxyethyl)-terephthalate calculated on terephthalic acid consumed was 98%.

Example 2

A mixture of 20 g. of pure terephthalic acid having a bulk density of 0.93, 11 g. of pure ethylene oxide and 0.2 g. of diethylamine were heated at 120° C. for 40 minutes in the same autoclave as described in Example 1. After completion of the reaction, the mixture was treated by a similar procedure as in Example 1. 28.2 g. of bis-($\beta$-hydroxyethyl)-terephthalate, colorless needles, melting point 109.5–111° C., as well as 1.2 g. of recovered terephthalic acid, 0.5 g. at first, and 0.7 g. subsequently were obtained. This last mentioned amount is the weight of residual terephthalic acid recovered by the filtration of the neutralized water suspension obtained by NaOH addition of the hydrolized solution of the filtrate separated from the product, as shown in Example 1. The yield of bis-($\beta$-hydroxyethyl)-terephthalate calculated on terephthalic acid consumed was 98%.

Example 3

A mixture of 20 g. of purified terephthalic acid having a bulk density of 0.88 g./ml., 11 g. of purified ethylene oxide and 0.2 g. of piperidine were heated to 120° C. for 40 minutes under agitation. After the reaction is completed, the mixture was treated by the procedure described in Example 1. 28.1 g. of bis-($\beta$-hydroxyethyl)-terephthalate, colorless needles having a melting point 109.5–111° C., and 1.1 g. of recovered terephthalic acid 0.5 g. at first and 0.6 g. subsequently, were obtained. The yield of bis-($\beta$-hydroxyethyl)-terephthalate was 97.2%, calculated on terephthalic acid consumed.

Example 4

A mixture of 40 g. of purified terephthalic acid having 0.45 bulk density, 40 g. of purified ethylene oxide and 0.4 g. of triethylamine were heated to 120° C. for 10 minutes. After the reaction, excess ethylene oxide was recovered, and the remaining mixture was treated according to Example 1. 48.8 g. of bis-($\beta$-hydroxyethyl)-terephthalate, colorless needles having the melting point 109–111° C., were obtained, and 7.4 g. of terephthalic acid, 7 g. at first, and 0.4 g. subsequently were recovered. The yield of bis-($\beta$-hydroxyethyl)-terephthalate on terephthalic acid consumed was calculated to be 97.8%.

Example 5

A mixture of 40 g. of purified terephthalic acid having 0.45 g./ml. bulk density, 30 g. of purified ethylene oxide and 0.4 g. of triethylamine were heated to 110° C. for 20 minutes. After the reaction was completed, excess ethylene oxide was recovered, and the remaining mixture was treated according to Example 1. 48.4 g. of bis-($\beta$-hydroxyethyl)-terephthalate, colorless needles having the melting point 109–111° C., were obtained, and 7.8 g. of terephthalic acid, 7.2 g. at first, and 0.6 g. subsequently were recovered. The yield of bis-($\beta$-hydroxyethyl)-terephthalate calculated on terephthalic acid consumed was 98.3%.

Example 6

A mixture of 20 g. of purified terephthalic acid having a bulk density of 0.89 g./ml., 10.8 g. of purified ethylene oxide, and 0.6 g. of mono-triethylammonium terephthalate were heated to 110° C. for 50 minutes. After the reaction was completed, the remaining mixture was treated according to Example 1. 28 g. of bis-($\beta$-hydroxyethyl)-terephthalate, colorless needles having the melting point 109–111° C., were obtained, and 1.3 g. of terephthalic acid, 0.6 g. at first and 0.7 g. subsequently were recovered. The yield of bis-($\beta$-hydroxyethyl)-terephthalate calculated on terephthalic acid consumed was 97.8%.

Example 7

A mixture of 20 g. of pure terephthalic acid having a bulk density of 0.56 g./ml., 11 g. of pure ethylene oxide and 0.2 g. of tetramethylammonium chloride were heated at 120° C. for 3 hours in the same autoclave as described in Example 1. After completion of the reaction, the mixture was treated by the similar procedure as in Example 1. 27.3 g. of bis-($\beta$-hydroxyethyl)-terephthalate, colorless needles, melting point 109.5–111° C., were obtained. As residue, 1 g. of terephthalic acid was recovered by the filtration of the solution containing the desired compound. The second recovery of terephthalic acid was omitted. The yield of bis-($\beta$-hydroxyethyl)-terephthalate calculated on terephthalic acid consumed was 93.8%.

Example 8

A mixture of 20 g. of pure terephthalic acid having a bulk density of 0.32 g./ml., 11 g. of pure ethylene oxide, 0.1 g. of diethylamine and 0.2 g. of isophthalic acid were heated to 120° C. for 1 hour in the same autoclave as described in Example 1. After completion of the reaction, the mixture was treated by a similar procedure as in Example 1. 28 g. of bis-($\beta$-hydroxyethyl)-terephthalate, colorless needles, melting point 109.5–111° C., as well as 1.2 g. of recovered terephthalic acid, 0.6 g. at first and 0.6 g. subsequently, were obtained. The yield of bis-($\beta$-hydroxyethyl)-terephthalate calculated on terephthalic acid consumed was 97.3%.

Example 9

A mixture of 20 g. of pure terephthalic acid having a bulk density of 0.43 g./ml., 10.8 g. of pure ethylene oxide, 0.2 g. of triethylamine and 10 g. of bis-($\beta$-hydroxyethyl)-terephthalate was heated to 110° C. for 40 minutes under agitation. After completion of the reaction, the mixture was treated by the procedure described in Example 1. 36.7 g. of bis-($\beta$-hydroxyethyl)-terephthalate, colorless needles having a melting point 109.5–111° C., and 1.1 g. of recovered terephthalic acid, 1.5 g. at first and 0.7 g. subsequently, were obtained. The yield of bis-($\beta$-hydroxyethyl)-terephthalate calculated on terephthalic acid consumed was 98%.

Example 10

A mixture of 20 g. of purified terephthalic acid having a bulk density of 0.45 g./ml., 10.8 g. of purified ethylene oxide, 0.2 g. of triethylamine and 10 ml. of acetone were heated to 120° C. for 1 hour under agitation. After the reaction, acetone was removed from the mixture by distillation, and the residue was treated by the procedure described in Example 1. 27.5 g. of bis-($\beta$-hydroxyethyl)-terephthalate, colorless needles, having a melting point 109–111° C., were obtained, and 1.7 g. of terephthalic acid, 1.2 g. at first, and 0.5 g. subsequently, were recovered. The yield of bis-($\beta$-hydroxyethyl)-terephthalate calculated on terephthalic acid consumed was 98.2%.

Example 11

A mixture of 20 g. of purified terephthalic acid having a bulk density of 0.45 g./ml., 11 g. of purified ethylene oxide, 0.2 g. of triethylamine and 10 ml. of toluene were heated to 120° C. for 1 hour under agitation. After completion of the reaction, toluene was removed from the mixture by distillation, and the residue was treated by the procedure described in Example 1. 27.4 g. of bis-($\beta$-hydroxyethyl)-terephthalate, colorless needles having a melting point 109–111° C., were obtained, and 1.7 g. of terephthalic acid, 1.1 g. at first, and 0.6 g. subsequently, were recovered. The yield of bis-($\beta$-hydroxyethyl)-terephthalate calculated on terephthalic acid consumed was 97.8%.

Example 12

A mixture of 20 g. of pure isophthalic acid having a bulk density of 0.88 g./ml., 11 g. of pure ethylene oxide and 0.2 g. of diethylamine were heated to 100° C. for 1 hour under agitation. After completion of the reaction, the mixture was dissolved in 60 g. of methylene dichloride. The solution was filtered. 1 g. of unreacted isophthalic acid was recovered as residue. The filtrate was cooled at 0–5° C., and crystals were precipitated. 18.4 g. of colorless needles having a melting point 77–79° C. were obtained. The product did not show a depression of the melting point with an authentic sample of bis-($\beta$-hydroxyethyl)-isophthalate by admixture. The mother solution separated from the crystals was distilled to remove methylene dichloride. To the residual mixture, 45 ml. of 10% NaOH aq. was added, and the solution was heated to the boiling point for 10 minutes. After cooling, the solution was acidified by 35% HCl aq. 6.1 g. of isophthalic acid was recovered as precipitate. The yield of bis-($\beta$-hydroxyethyl)-isophthalate calculated on isophthalic acid consumed was 93%.

Example 13

A mixture of 20 g. of terephthalic acid, 10.6 g. of ethylene oxide and a catalyst listed in Table 1 were heated to 120° C. in a Pyrex autoclave. The pressure in the reactor went up to a peak and down gradually. The time required from the point of initiation of the reaction at 120° C. to the point when the pressure in the reactor went down to 0.5 kg./cm.$^2$ gauge was investigated, the results were shown in Table 1.

TABLE 1

| No. | Catalyzer of reaction | | Time (minutes) |
|---|---|---|---|
| | Catalyst, triethylamine (g.) | Co-catalyst, isophthalic acid (g.) | |
| 1 | 0.2 | 2 | 50 |
| 2 | 0.2 | | 120 |
| 3 | 0.1 | 2 | 90 |
| 4 | 0.1 | | 180 |
| 5 | 0.05 | 2 | 120 |
| 6 | 0.05 | | 240 |
| 7 | 0.02 | 2 | 270 |
| 8 | 0.02 | | 600 |

The effect of the addition of isophthalic acid which is shown was obvious.

Example 14

Mixtures of 20 g. pure terephthalic acid having different bulk densities, with different amounts of ethylene oxide and 2 g. of tripropylamine were heated. The time defined in Example 13 was investigated. The results were shown in Table 2.

TABLE 2

| No. | Bulk density of terephthalic acid, g./ml. | Mole ratio of ethylene oxide against terephthalic acid | Time (minutes) |
|---|---|---|---|
| 1 | 0.35 | 2.0 | 140 |
| 2 | 0.35 | 1.5 | 210 |
| 3 | 0.35 | 1.2 | 420 |
| 4 | 0.46 | 2.0 | 110 |
| 5 | 0.46 | 1.5 | 180 |
| 6 | 0.46 | 1.2 | 360 |
| 7 | 0.63 | 2.0 | 90 |
| 8 | 0.63 | 1.5 | 120 |
| 9 | 0.63 | 1.2 | 180 |
| 10 | 0.83 | 2.0 | 75 |
| 11 | 0.83 | 1.5 | 75 |
| 12 | 0.83 | 1.2 | 90 |
| 13 | 0.92 | 2.0 | 50 |
| 14 | 0.92 | 1.5 | 60 |
| 15 | 0.92 | 1.2 | 80 |

From the data in Table 2, the effect caused by the bulk density of terephthalic acid on the rate of the addition reaction becomes obvious.

Example 15

A mixture of 20 g. of terephthalic acid, 10.6 g. of ethylene oxide and 0.2 g. of triethylamine was heated to 120° C. The amount of ethylene oxide used up in the reaction was investigated under various reaction times while keeping the temperature at 120° C. The results were shown in Table 3.

TABLE 3

| No. | Time (min.) | Consumed amount of ethylene oxide | | Melting point of polyethylene terephthalate (° C.) |
|---|---|---|---|---|
| | | G. | Mole ratio [1] | |
| 1 | 1 | 5.7 | 1.05 | 265 |
| 2 | 3 | 6.4 | 1.20 | 265 |
| 3 | 5 | 7.2 | 1.35 | 264.5 |
| 4 | 10 | 8.0 | 1.50 | 264.2 |
| 5 | 15 | 8.5 | 1.60 | 263.7 |
| 6 | 20 | 8.8 | 1.65 | 263 |
| 7 | 30 | 9.3 | 1.75 | 261 |

[1] Mole ratio against terephthalic acid.

We claim:

1. Method for producing bis - ($\beta$ - hydroxyethyl) terephthalate by reacting terephthalic acid with ethylene oxide comprising heating to a temperature of 80 to 160° C. a mixture of terephthalic acid having a bulk density of at least 0.6 g./ml. and ethylene oxide in a molar ratio of the ethylene oxide to the terephthalic acid of at least 1.3 in the presence of 0.01 to 2% by weight, based on the weight of the terephthalic acid, of a catalyst of the group consisting of primary, secondary and tertiary organic amines, salts of said organic amines, quaternary ammonium salts, organic phosphines, amides and amino acids under a gas of the group consisting of inert gases and gaseous ethylene oxide and in the presence of essentially no solvent.

2. A method according to claim 1, in which said heating is conducted in the further presence of a co-catalyst consisting of isophthalic acid.

3. A method according to claim 1, in which said molar ratio is from 1.5 to 4.0.

4. A method according to claim 1, in which said heating is conducted in the further presence of bis-($\beta$-hydroxyethyl) terephthalate in a weight quantity no greater than the weight of the terephthalic acid.

5. A method according to claim 1, in which said temperature is 100 to 130° C.

6. A method according to claim 1, in which the reaction is stopped before a by-product having the formula

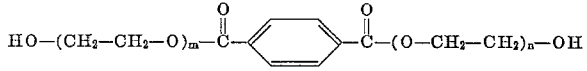

is formed, $m$ and $n$ in said formula each representing an integer of 1 to 3 and the sum of $m$ and $n$ is equal to at least 3.

7. A method according to claim 1, in which the reaction is stopped after no more than 30 minutes.

References Cited
UNITED STATES PATENTS 2,910,490  10/1959  Malkemus _____ 260—475
3,037,049   5/1962  Vaitekunas _____ 260—475

JAMES A. PATTEN, Primary Examiner

E. J. SKELLY, Assistant Examiner